Aug. 24, 1937.                B. WEMPE                2,091,087

PROCESS FOR THE PRODUCTION OF PURE BERYLLIUM

Filed Dec. 12, 1933

INVENTOR

UNITED STATES PATENT OFFICE 2,091,087

PROCESS FOR THE PRODUCTION OF PURE BERYLLIUM

Bernhard Wempe, Berlin, Germany

Application December 12, 1933, Serial No. 702,062
In Germany August 4, 1932

3 Claims. (Cl. 75—10)

The invention relates to a process of and apparatus for the production of readily oxidizable metals in a pure state, such for example as beryllium.

The present invention is based on the principle that the conversion of beryllium compounds into beryllium, for example, by means of a reducing metal, such as calcium, must proceed preventing access of air throughout the reaction, whilst every possibility of oxidation must be prevented until the pure metal solidifies. Consequently, the procedure adopted in carrying out the invention is based on the principle of carrying out the reaction and conversion right from the introduction of the originating material up to the formation of the regulus, in a single working stage. During the reduction of the beryllium compounds, the amount of heat—generated either by electrical or chemical means, or a combination of the two—supplied, is at least sufficient for the melting temperature of the beryllium to be attained. This necessitates lining the reaction vessel with a material that will not combine, either with the reducing metal or with the beryllium, even at the highest temperatures occurrring in the furnace.

The process of the present invention accordingly comprises in the first place, liquefying the reducing metal in a crucible provided with a lining such as corundum which fulfills the hereinbefore mentioned requirement, this step being carried out under a vacuum or in an atmosphere that does not affect the reaction and thus is free from oxygen, and, therefore, may be one that consists of either an inert gas or hydrogen. "Inert" is therefore used to express the thought that such an atmosphere does not affect the reaction. The beryllium compound under treatment is thereupon introduced into the reducing metal, so that the reaction will proceed whilst maintaining the temperature and carrying out the process in such a manner that all the reaction components remain in a molten condition without exceeding the boiling temperature of beryllium. During the reaction, the consumed reducing metal is continuously replenished until the beryllium compounds present are completely reduced, whereupon the temperature is raised until the melting point of pure beryllium is reached. After cooling, the beryllium can then be removed in the condition of regulus.

It is advisable to carry out the reaction in such a manner that all the reaction components are together in a molten condition and that the reaction mixture contains the largest possible amount of beryllium, thereby increasing the yield and serving to disengage larger amounts of heat, and finally, that the reaction material is maintained, as far as possible, in vortical motion.

To ensure that no absorption of oxygen can occur from the furnace lining, it is necessary not only to take into consideration the chemical composition of said lining, but also, to select a lining material that melts at a higher temperature than the reaction temperature of the originating material under treatment and from which the readily oxidizable metals are to be produced in a pure state.

The furnace for the production of such metals will generally be in the form of a stationary crucible, or a carbon or metallic tube. The oxides and halides of the alkaline earth metals, or of the alloying metals, may be employed as constructional materials for the furnace lining, but difficulty is encountered in the preparation of said lining if the materials be poured into the vessel in the usual manner.

According to the present invention, the furnace is lined in the following manner: The reaction vessel or furnace is filled with the lining material, the tube being then heated to the melting temperature of the lining material and rotated either at the same time as, or directly after, the lining material melts. The rotation causes a homogeneous film of the lining material to form on the inside of the tube and this layer is caused to solidify while the rotation is being continued.

The material under treatment can also be brought into reaction in a rotary furnace, but at a lower temperature, so that the lining does not melt.

If a rotary furnace be not employed, the furnace can also be lined by forming the lining material into moulded blocks or rings, by casting, sintering or pressing, and then lining the furnace therewith. In the case of stationary crucibles, the heat conductivity of these moulded blocks should be as high as possible.

Finally, the reaction furnace may also be designed as a refractory metallic mould, in which the lining material are sintered or melted and then rammed. Moreover, when operating in a rotary furnace, there is no need, for the purpose of ensuring the production of a pure metal, that the lining material should have a higher melting point than the reaction components. It will then be sufficient to ensure that the lining has a higher specific gravity than the substances taking part in the reaction, inasmuch as the latter will then be unable to penetrate to the wall of the furnace, even when the lining is in a molten condition.

If, for any reason, in the case of stationary furnaces, it is impossible to line the furnace with substances of a more refractory character than those taking part in the reaction, care must be taken to cool the lining so as to maintain the mechanical strength that renders it a suitable lining. The walls of the reaction vessel can be cooled by natural radiation of heat, by auxiliary cooling or by accelerating the conversion process so that no injurious heating of the lining can occur. If a high-frequency induction furnace of large capacity be employed, the high-frequency heating coil can be used as a cooling jacket.

In order more clearly to understand the invention, reference is made to the accompanying drawing, which illustrates diagrammatically and by way of example, two typical embodiments of furnace suitable for carrying out the invention and in which.

Figure 1:
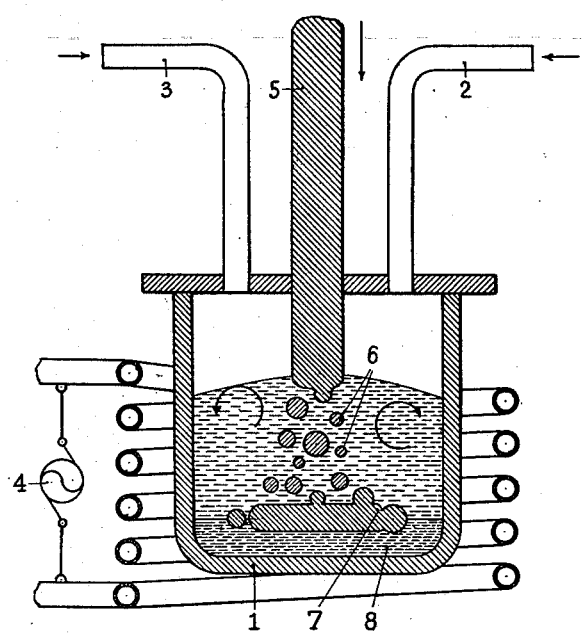
Fig. 1 is a section through a stationary crucible furnace.

Referring to Fig. 1, 1 is a crucible, of refractory material, which is filled with a reducing metal and closed by a cover. The air is then evacuated, "Formier gas" (a mixture of hydrogen and nitrogen) is blown in, followed by hydrogen, through the pipes 2 and 3 which represent the inlet and outlet. The necessary heat for fusion is generated by the high-frequency coil, which surrounds the crucible, and is energized by the alternator 4, and, at the same time, the temperature of the walls is lowered by the water-cooled copper coil. When the reducing metal has attained a temperature of 600–1400° C. (depending on its boiling point), the beryllium compound is introduced. In the example, it is assumed that said compound has been cast to a homogeneous round rod 5, which is suspended in the bubbling, highly reducing metal. As soon as the surface of the submerged portion has reached the reaction temperature, the beryllium compound undergoes conversion accompanied by rising temperature. The liquefied reducing-metal compounds and the metallic beryllium, both of which are heavier than the reducing metal, sink to the bottom, the reaction products being continuously and rapidly removed from the points of reaction by the continuous violent movement. After the additional supply or replenishing supply of the reducing metal has been cut off, the supply of the beryllium compound is continued for a short time, the temperature being maintained at about 1500° C. by the high-frequency heating apparatus, and during this period, the metallic beryllium fuses to a homogeneous mass. The foregoing operation and procedure may be better understood from the following. After the reaction of the beryllium oxide is finished, i. e. after enough beryllium has been reduced, the supply of the beryllium oxide is continued for a short time, while the melting of the pure beryllium begins. In this manner, the production of pure beryllium and the cooling of the beryllium to form a regulus is effected. It is a fact that in this operation, the materials in the furnace are in movement and that there is yet a reducing metal present which has not yet been converted.

If, from any cause, the melting point of the furnace lining is below 1100° C., the crucible must be rotated or provided with special cooling means. When a high rotational speed of the crucible has been reached the beryllium compound is introduced in the condition of vapour, liquid or powder.

The drawing illustrates an intermediate phase in which a portion of the beryllium compound 5 has already melted. The descending reaction products are indicated by 6, whilst 7 is the metallic beryllium and 8, the waste product of the reaction (reducing-metal compound). The domed upper surface of the reducing metal is due to the "pinch" effect.

Figure 2:
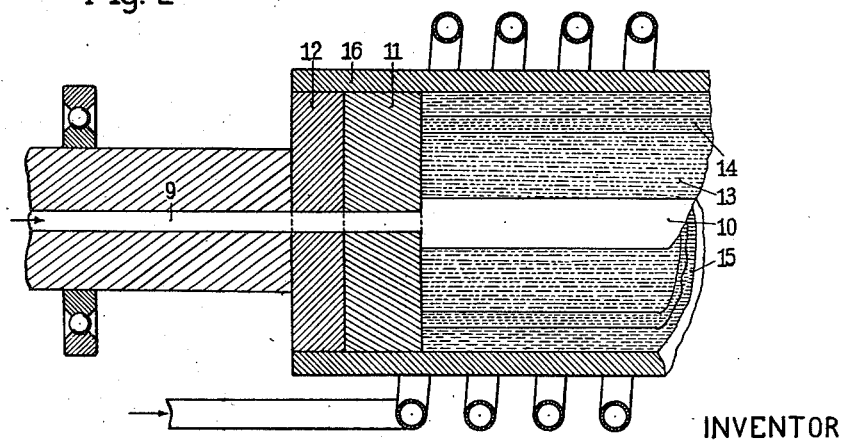
Fig. 2 is a section through a rotary furnace.

Fig. 2 illustrates one end portion of a horizontal rotary furnace in which the reaction space is formed by the molten reducing metal. Fig. 2 shows ball bearings for the mounting of the rotary furnace.

The beryllium compound in finely divided form is introduced through the conduit 9, being blown therethrough by a gas, such as a current of hydrogen and enters the free reaction space 10 through a cooled furnace end wall 11 (solidified lining material). The outer cover 12 of the furnace may be constructed of metal, graphite or sintered corundum. The molten reducing metal is indicated by 13, outside which lies a ring 14 of the resulting metallic beryllium which in turn is surrounded by the waste products 15 of higher specific gravity. The actual furnace tube is 16.

Example I

The reaction furnace is filled with reducing metal, such as calcium, which is heated to and above its melting temperature by the high-frequency heating apparatus. As the result of the presence of hydrogen, $CaH_2$ is formed, which becomes partially dissociated at the high temperature. The beryllium compound consists, for example, of beryllium oxide, beryllium fluoride, together if desired with the fluoride of a foreign metal, which are introduced singly or jointly. The beryllium compound is reduced, with formation of metallic beryllium, and $CaO$, and in addition calcium fluoride having a melting point that does not exceed the boiling point of beryllium. After the entire quantity introduced has been reduced, the temperature is raised up to the boiling point of the beryllium, or in other words, only so far that the individual drops of Be coalesce. At the same time, the high-frequency heating sets up, in the particles, a movement which very greatly accelerates the coalescence of the drops.

Example II

The furnace is filled with magnesium and then raised to a temperature above the melting point of that metal by the high-frequency current. A beryllium fluoride compound is then introduced, and reduction follows, metallic beryllium and a magnesium fluoride compound being obtained as reaction products.

Example III

The furnace is completely filled with calcium, beryllium oxide and beryllium fluoride, or a foreign metal fluoride. This thermal mixture should contain a few large lumps of calcium to accelerate the absorption of the heat furnished by the high-frequency induction apparatus, when this latter is employed. This precaution is unnecessary when resistance heating is employed, inasmuch as, in that case, the heat is absorbed by conduction. In such event it is advisable to employ a reaction vessel constructed of carbon or graphite, so that it may at the same time serve as heating resistance. In addition to metallic beryllium, the reaction products are calcium oxide and fluoride.

Example IV

In the reduction of beryllium oxide with calcium, beryllium fluoride, or a foreign metal fluoride compound is added in such quantity that the mixture will have a melting point above 800° C. The reduction then proceeds with formation of metallic beryllium and CaO.

Example V

In order to reduce beryllium chloride ($BeCl_2$), beryllium fluoride, or foreign metal fluorides, are added thereto, so that fluorides, which raise the melting point and are of high specific gravity, are formed as reaction products. Assuming the originating material to consist of $BeCl_2$ and $KBeF_2$, and the reducing metal of magnesium, the resulting reaction products will be $MgCl_2$, $MgF_2$ and pure beryllium, whilst the potassium distils over.

There is no need to introduce all the fluoride at once and the reduction may also be effected in successive stages, for example, $BeCl_2$ first and then the fluoride compound.

Example VI

Sodium is heated to its boiling point in the reaction furnace and beryllium chloride is then continually introduced undergoing decomposition into two molecules of sodium chloride and beryllium. When the whole has been converted, the temperature is raised to 1300° C., the beryllium being thus brought into the molten state in order to be recovered as regulus.

Example VII

A sump of molten beryllium is present in the crucible of the reaction furnace. The atmosphere consists of $BeCl_2$ vapour. Sodium is gradually introduced on to the beryllium and becomes vaporized, reacting with the $BeCl_2$, the beryllium formed then immediately subsiding in the molten state.

In all the foregoing examples, heavy metals may be added, as alloying metals, during process.

I claim:—

1. A process for the production of beryllium in a pure state which process comprises subjecting beryllium compounds in the presence of reducing metals to a heat treatment in an atmosphere which does not react with beryllium, and keeping the reaction components in vertical motion during and after the reaction, and continuing the reaction until the metal content of the beryllium compound has been reduced to metal and thereupon and in the same operation melting the pure beryllium metal, and subsequently cooling it so as to form a regulus.

2. A process for the production of beryllium in a pure state, which process comprises subjecting beryllium compounds in the presence of reducing metals to heat treatment in an atmosphere which does not react with beryllium, and utilizing high frequency induction heating while keeping the reaction components in vertical motion during and after the reaction, and continuing the reaction until the metal content of the beryllium compound has been reduced to metal and thereupon and in the same operation melting the pure beryllium metal, and subsequently cooling the pure beryllium metal so as to form a regulus.

3. A process for the production of pure beryllium from metal containing the compounds, comprising conducting the treatment of beryllium compounds and reducing metals under conditions of air exclusion throughout the procedure, introducing the beryllium compound to be treated into the reaction chamber by means of a current of hydrogen, regulating the heat so that reduction proceeds continuously until on termination of the reduction of the beryllium compound so introduced, the pure metal is fused to a regulus, the entire heat treatment being conducted as one operative step up to the point at which it is possible for a regulus to form.

BERNHARD WEMPE.